US008659875B2

(12) United States Patent
Kagata et al.

(10) Patent No.: US 8,659,875 B2
(45) Date of Patent: Feb. 25, 2014

(54) CAPACITOR AND MANUFACTURING METHOD THEREFOR (75) Inventors: Hiroshi Kagata, Osaka (JP); Masayuki Hogiri, Osaka (JP)

(73) Assignee: Panasonic Corporation, Osaka (JP)

( * ) Notice: Subject to any disclaimer, the term of this patent is extended or adjusted under 35 U.S.C. 154(b) by 128 days.

(21) Appl. No.: 13/254,219

(22) PCT Filed: Mar. 26, 2010

(86) PCT No.: PCT/JP2010/002182
§ 371 (c)(1),
(2), (4) Date: Sep. 1, 2011

(87) PCT Pub. No.: WO2010/116656
PCT Pub. Date: Oct. 14, 2010

(65) Prior Publication Data
US 2012/0120555 A1    May 17, 2012

(30) Foreign Application Priority Data
Apr. 8, 2009    (JP) ................................ 2009-093820

(51) Int. Cl.
*H01G 4/06*    (2006.01)
*H01G 5/013*    (2006.01)
(52) U.S. Cl.
USPC ........................... 361/524; 361/503; 29/25.03
(58) Field of Classification Search
USPC ............... 361/312–313, 524; 29/25.03, 25.42
See application file for complete search history.

(56) References Cited

U.S. PATENT DOCUMENTS

| 2,778,762 A * | 1/1957 | Eisler ............................ 428/325 |
| 2004/0238848 A1 | 12/2004 | Arai |

FOREIGN PATENT DOCUMENTS

| EP | 2 148 341 A1 | 1/2010 |
| JP | 04-087316 A | 3/1992 |
| JP | 08-167543 A | 6/1996 |
| JP | 2002-343684 A | 11/2002 |
| JP | 2003-206135 A | 7/2003 |
| JP | 2008205112 A * | 9/2008 |
| JP | 2008-270525 A | 11/2008 |
| JP | 2008-277724 A | 11/2008 |

OTHER PUBLICATIONS

International Search Report for Application No. PCT/JP2010/002182., Jun. 15, 2010, Panasonic Corporation.

* cited by examiner

*Primary Examiner* — Eric Thomas
(74) *Attorney, Agent, or Firm* — RatnerPrestia (57) ABSTRACT A capacitor includes an electrode and a dielectric layer over the electrode. The dielectric layer includes plural metal oxide particles which are spread, and have an aperture constituted by a space provided between the metal oxide particles. The capacitor further includes an insulating portion on a portion of the electrode facing an opening of the aperture of the dielectric layer. The insulating portion covers the opening of the aperture. This capacitor prevents short-circuiting between the electrodes, thus being highly reliable.

28 Claims, 11 Drawing Sheets

| Number of Dielectric Layers | Yield Rate Based on Capacitance | |
|---|---|---|
| | Sample 1 | Sample 2 |
| 1 | 90% | 0% |
| 2 | 92% | 0% |
| 3 | 95% | 0% |
| 5 | 99% | 10% |
| 10 | 99% | 20% |

CAPACITOR AND MANUFACTURING METHOD THEREFOR

This Application is a U.S. National Phase Application of PCT International Application PCT/JP2010/002182.

TECHNICAL FIELD

The present invention relates to a capacitor with a dielectric layer.

BACKGROUND ART

Capacitors have functions to store energy and act as an electric filter, and thus, they are components indispensable for electronic apparatuses. In line with a recent downsizing trend of electronic apparatuses, capacitors with higher capacitance are demanded on the market. A capacitor includes a dielectric layer between a pair of electrodes. The dielectric layer, upon being thin, provides the capacitor with high capacitance.

Patent Literature 1 discloses a conventional capacitor with high capacitance that includes an oxide nanosheet, such as a titanate nanosheet, that is a dielectric material providing a thin layer. However, a pair of electrodes may be short-circuited via the oxide nanosheet in this conventional capacitor.

CITATION LIST

Patent Literature

Patent Literature 1: Japanese Patent Laid-Open Publication No. 2008-277724

SUMMARY OF THE INVENTION

A capacitor includes an electrode and a dielectric layer over the electrode. The dielectric layer includes plural metal oxide particles which are spread, and have an aperture constituted by a space provided between the metal oxide particles. The capacitor further includes an insulating portion on a portion of the electrode facing an opening of the aperture of the dielectric layer. The insulating portion covers the opening of the aperture.

This capacitor prevents short-circuiting between the electrodes, thus being highly reliable.

DETAILED DESCRIPTION OF PREFERRED EMBODIMENTS

Exemplary Embodiment 1

Figure 1:
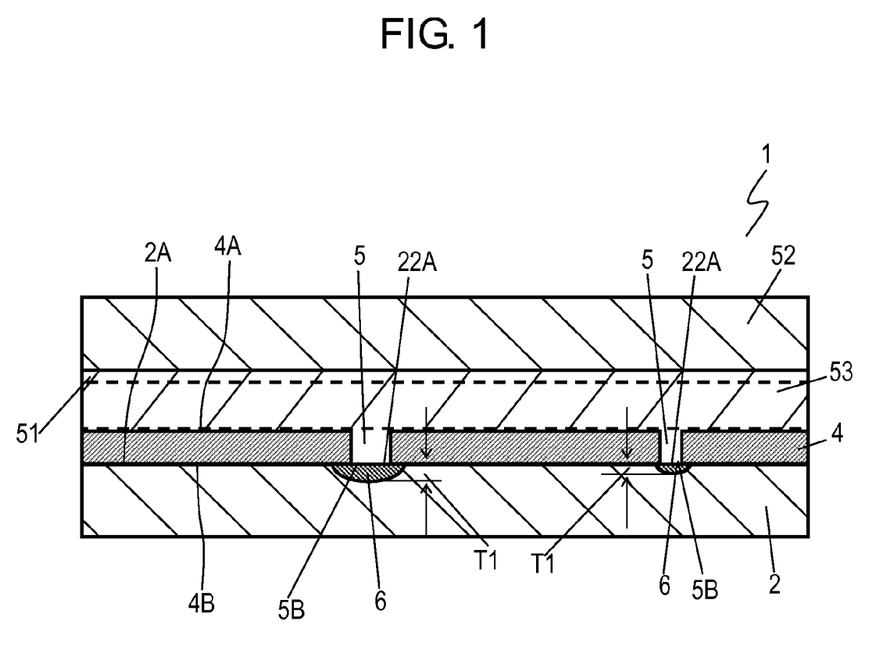
FIG. 1 is a sectional view of a capacitor in accordance with Exemplary Embodiment 1 of the present invention.

FIG. 1 is a schematic sectional view of capacitor 1 in accordance with Exemplary Embodiment 1 of the present invention. Capacitor 1 includes electrode 2, dielectric layer 4 disposed on upper surface 2A of electrode 2, electrode 52 facing upper surface 4A of dielectric layer 4, and electrolyte 51 provided between dielectric layer 4 and electrode 52. Lower surface 4B of dielectric layer 4 is situated on upper surface 2A of electrode 2. Electrode 2 is a foil made of conductive material, and is preferably a foil made of valve metal, such as aluminum or titanium. Separator 53 may be disposed between electrodes 2 and 52.

Figure 2:
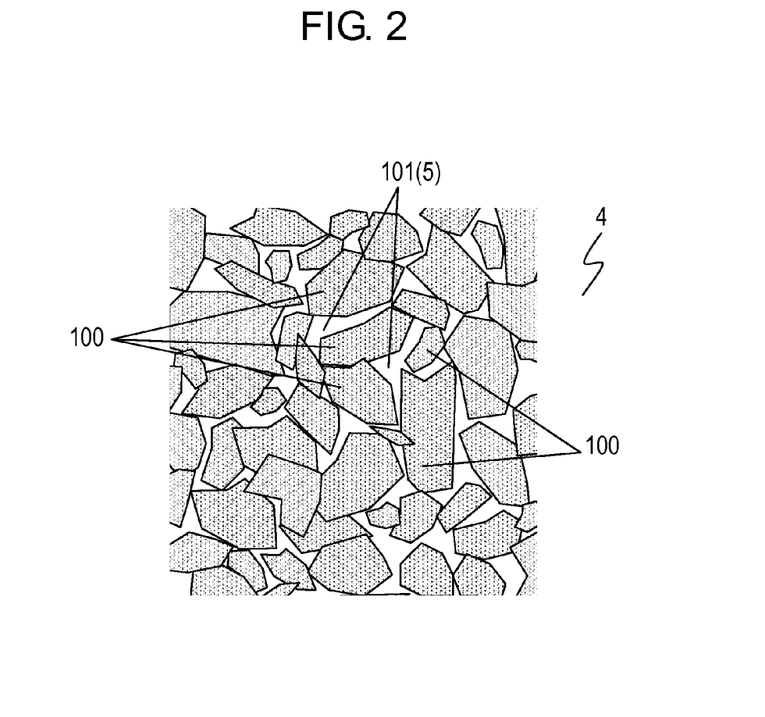
FIG. 2 is a schematic enlarged view of a dielectric layer of the capacitor in accordance with Embodiment 1.

FIG. 2 is an enlarged schematic view of dielectric layer 4. Dielectric layer 4 includes plural metal oxide particles 100 spread over upper surface 2A of electrode 2. Metal oxide particles 100 are made of oxide nanosheets, such as titanate nanosheets or niobate nanosheets. Each of metal oxide particles 100 has a thickness of a total thickness of several atoms. The thickness ranges approximately from 0.3 nm to 2 nm, preferably not less than 0.3 nm and not greater than 50 nm. Metal oxide particle 100 has a length and a width which range approximately from 10 nm to 1 mm. Metal oxide particles 100 are spread over and adhere to upper surface 2A of electrode 2 with an adhesive support layer made of cation provided at upper surface 2A of electrode 2. Metal oxide particles 100 can hardly be spread over upper surface 2A of electrode 2 without any space between metal oxide particles 100. Aperture 5 constituted by space 101 provided between metal oxide particles 100 is formed in dielectric layer 4. Aperture 5 passes through between upper surface 4A and lower surface 4B of dielectric layer 4.

As shown in FIG. 1, insulating portion 6 is formed on non-dielectric-layer portion 22A of upper surface 2A of electrode 2 facing aperture 5. Non-dielectric-layer portion 22A is exposed through aperture 5. Electrode 2 is made of metal. Insulating portion 6 is made of oxide of this metal. For example, if electrode 2 is made of aluminum, insulating portion 6 is made of aluminum oxide. Insulating portion 6 can be formed by oxidizing upper surface 2A of electrode 2 via aperture 5 by a method, such as anode oxidization or heat treatment.

Thickness T1 (nm) of insulating portion 6 is determined according to withstand voltage WV (V) of the capacitor. If insulating portion 6 is formed by anode oxidization, thickness T1 (nm) is determined by the following equation.

$$T1 = 1.4 \times WV$$

Figure 3:
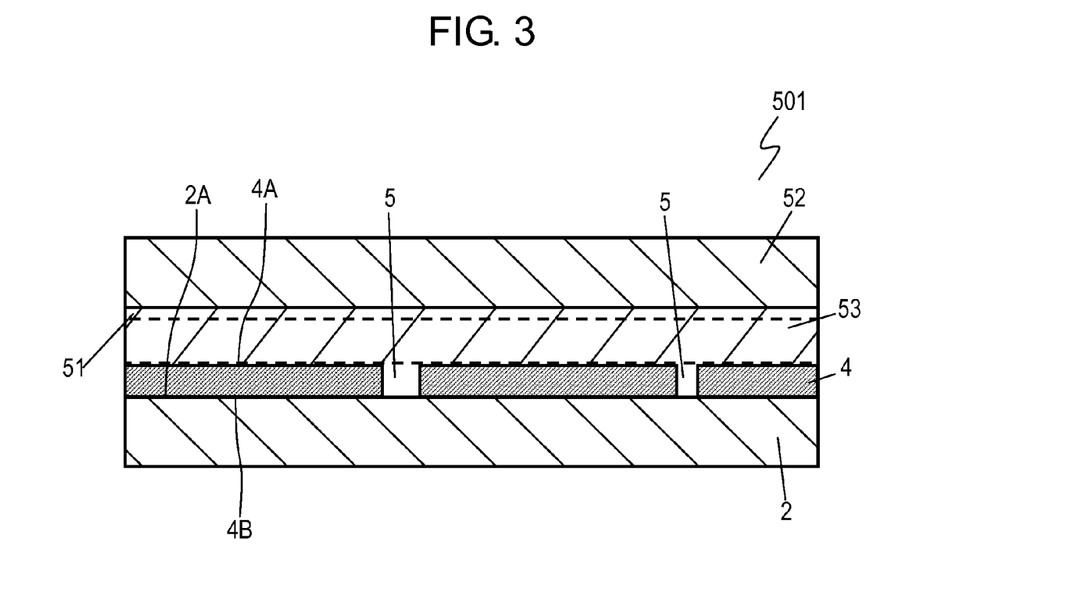
FIG. 3 is a sectional view of a capacitor of a comparative example.

In the particular case that electrolyte 51 is electrolytic solution, electrolyte 51 easily enters through aperture 5. FIG. 3 is a schematic sectional view of capacitor 501 of a comparative example. In FIG. 3, components identical to those of capacitor 1 according to Embodiment 1 shown in FIG. 1 are denoted by the same reference numerals. Capacitor 501 shown in FIG. 3 does not include insulating portion 6, thus allowing electrode 2 to be exposed from aperture 5. In capacitor 501, electrolyte filling aperture 5 may contact electrode 2, and causes short-circuiting between electrodes 2 and 52.

It is extremely difficult to inspect whether or not aperture 5 exists in dielectric layer 4 with a simple method, such as visual inspection. The presence of aperture 5 in dielectric layer 4 can be practically recognized firstly by inspecting characteristics of capacitor 501 after manufacturing capacitor 501 with using oxide nanosheets. Therefore, it is difficult to reduce a defect rate in the manufacturing process.

In capacitor 1 according to Embodiment 1 shown in FIG. 1, even in the particular case that electrolyte 51 is electrolytic solution, insulating portion 6 prevents electrolyte 51 from directly contacting electrode 2 even if electrolyte 51 enters through aperture 5. A defect caused by short-circuiting of electrodes 2 and 52 can thus be avoided.

Dielectric layer 4 made of oxide nanosheets can be thin due to insulating portion 6 insulating between electrolyte 51 and electrode 2. Even in capacitor 501 of the comparative example without insulating portion 6, aperture 5 can be clogged by a lot of stacked layers made of metal oxide particles 100 to cause aperture 5 to have a complicated shape passing through from upper surface 4A to lower surface 4B of dielectric layer 4, so as to suppress the short-circuiting. However, this method fails to make dielectric layer 4 thin, and accordingly, prevents capacitor 501 from having a large capacitance.

As described above, insulating portion 6 suppresses the short-circuiting between electrodes 2 and 52 even if capacitor 1 includes dielectric layer 4 made of oxide nanosheets in which the presence of aperture 5 can be hardly checked by a simple method. In addition, dielectric layer 4 having aperture 5 does not need to be disposed as a defective, hence improving production efficiency of capacitor 1.

In the case that electrode 2 is made of aluminum, insulating portion 6 is made of oxidized aluminum. Relative dielectric constant of oxidized aluminum is not so large, of about 8. Relative dielectric constant of titanate nanosheet that can be used as a material of dielectric layer 4 is about 125. Relative dielectric constant of niobate nanosheet is about 300. These nanosheets can increase relative dielectric constant of dielectric layer 4, and provides capacitor 1 with a large capacitance accordingly.

Figure 4A:
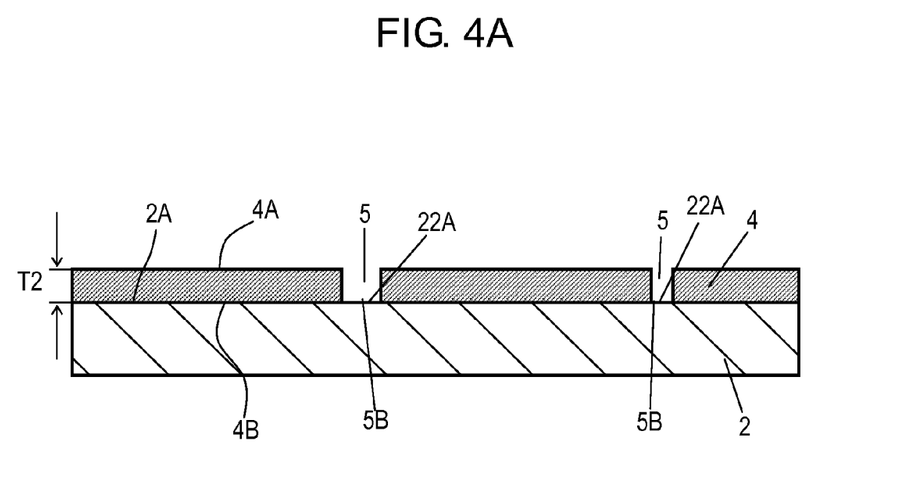
FIG. 4A is a sectional view of the capacitor in accordance with Embodiment 1 for illustrating a process for manufacturing the capacitor.
Figure 4B:
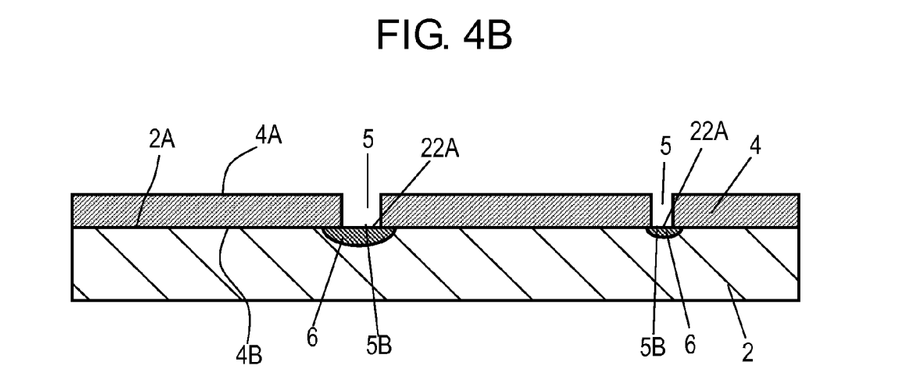
FIG. 4B is a sectional view of the capacitor in accordance with Embodiment 1 for illustrating a process for manufacturing the capacitor.

A method of manufacturing capacitor 1 will be described below. FIGS. 4A and 4B are sectional views of capacitor 1 for illustrating the method of manufacturing capacitor 1.

As shown in FIG. 4A, dielectric layer 4 is disposed on upper surface 2A of electrode 2 made of a thin conductive foil. Aperture 5 passing through between upper surface 4A and lower surface 4B of dielectric layer 4 has opening 5B which opens to upper surface 2A of electrode 2. Upper surface 2A of electrode 2 has, non-dielectric-layer portion 22A that is a portion exposed from aperture 5.

Next, as shown in FIG. 4B, insulating portion 6 is formed on non-dielectric-layer portion 22A by oxidizing, via aperture 5, non-dielectric-layer portion 22A facing aperture 5. The oxidizing of non-dielectric-layer portion 22A via aperture 5 prevents a portion of upper surface 2A of electrode 2 contacting dielectric layer 4 from being oxidized except non-dielectric-layer portion 22A and a portion of upper surface 2A around non-dielectric-layer portion 22A. This oxidization thus prevents formation of an insulating film on the portion of upper surface 2A except non-dielectric-layer portion 22A and the portion of upper surface 2A around non-dielectric-layer portion 22A.

Then, as shown in FIG. 1, electrode 52 facing upper surface 4A of dielectric layer 4 is provided. Electrolyte 51 fills between upper surface 4A of dielectric layer 4 and electrode 52. Separator 53 may be disposed between electrodes 2 and 52.

Figure 4C:
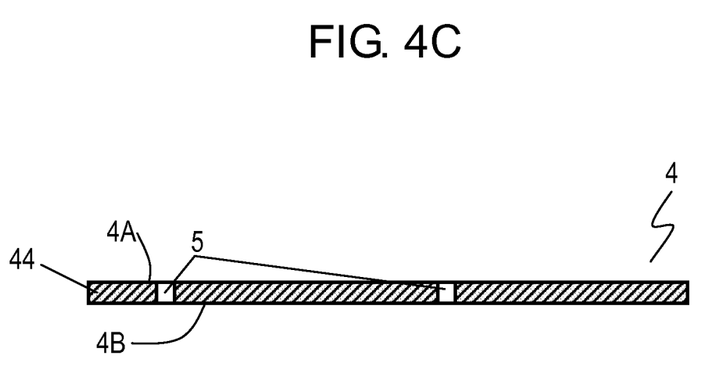
FIG. 4C is a schematic sectional view of the dielectric layer of the capacitor in accordance with Embodiment 1.
Figure 4D:
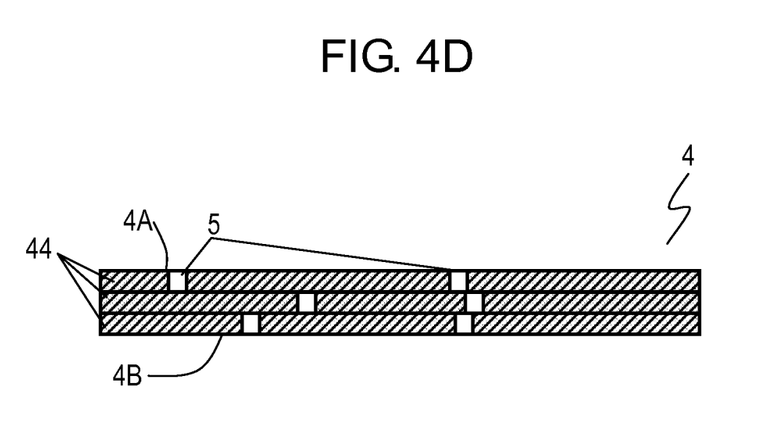
FIG. 4D is a schematic sectional view of another dielectric layer in accordance with Embodiment 1.

FIGS. 4C and 4D are schematic sectional views of dielectric layer 4. As shown in FIG. 4C, dielectric layer 4 is made of dielectric film 44, a single layer of an oxide nanosheet. Dielectric layer 4 may be made of dielectric film 44 made of plural laminated oxide nanosheets, as shown in FIG. 4D. Thickness T2 of dielectric layer 4 made of dielectric film(s) 44 ranges from 0.3 nm to 50 nm. Thickness T2 within this range may likely produce aperture 5 in dielectric layer 4.

A diameter of aperture 5 shown in FIG. 4A is constant from upper surface 4A to lower surface 4B. In fact, as shown in FIG. 2, the diameter of aperture 5 is not constant since aperture 5 is constituted by spaces 101 formed in dielectric layer 4 by metal oxide particles 100 that are multiple oxide nanosheets. Aperture 5 generally has a complicated shape.

Insulating portion 6 may extend to around non-dielectric-layer portion 22A in addition to non-dielectric-layer portion 22A facing aperture 5. This reliably prevents electrolyte 51 from contacting electrode 2.

Before forming dielectric layer 4, upper surface 2A of electrode 2 may be provided with an acid treatment or an alkali treatment. The acid or alkali treatment removes an oxidized film on upper surface 2A, and roughens upper surface 2A to enlarge its surface area, accordingly increasing capacitance of capacitor 1.

Acids that can be used for the acid treatment may employ HCl, $H_2SO_4$, $H_3PO_4$, and $(COOH)_2$. Alkalis that can be used for the alkali treatment may employ KOH and NaOH.

Similarly, the oxidized film on upper surface 2A of electrode 2 can be removed by cathode reduction of upper surface 2A of electrode 2. This reduction roughens upper surface 2A to enlarge its surface area, accordingly increasing a capacitance of capacitor 1. In this cathode reduction, the surface of electrode 2 can be reduced by using electrode 2 as a cathode, and applying a current between a counter electrode that becomes an anode in the electrolytic solution.

Upper surface 2A of electrode is roughened by the acid or alkali treatment or cathode reduction of upper surface 2A of electrode 2. If an oxidized nanosheet, for example, is disposed on roughened upper surface 2A of electrode 2 as dielectric layer 4, the oxidized nanosheet is difficult to be neatly and evenly disposed since upper surface 2A is complicatedly roughened. Aperture 5 is thus likely generated in dielectric layer 4. If dielectric layer 4 is formed on upper surface 2A of electrode 2 roughened by a method, such as sputtering, except for solution method, it is more difficult to evenly form dielectric layer 4 without generating aperture 5 than forming dielectric layer 4 by a solution method.

In capacitor 1 according to Embodiment 1, insulating portion 6 covers opening 5B of aperture 5. This avoids contact of electrode 2 and electrolyte 51. Therefore, insulating portion 6 effectively prevents short-circuiting between electrodes 2 and 52 in capacitor 1 manufactured using the manufacturing process of roughening upper surface 2A of electrode 2 by the acid or alkali treatment, or cathode reduction. Insulating portion 6 preferably covers opening 5B of aperture 5 completely.

Insulating portion 6 is made of an oxidized film formed by oxidizing electrode 2 made of metal. However, insulating portion 6 is not limited to the oxidized film. As long as contact of electrode 2 and electrolyte 51 can be prevented, any composition is applicable.

Figure 5:
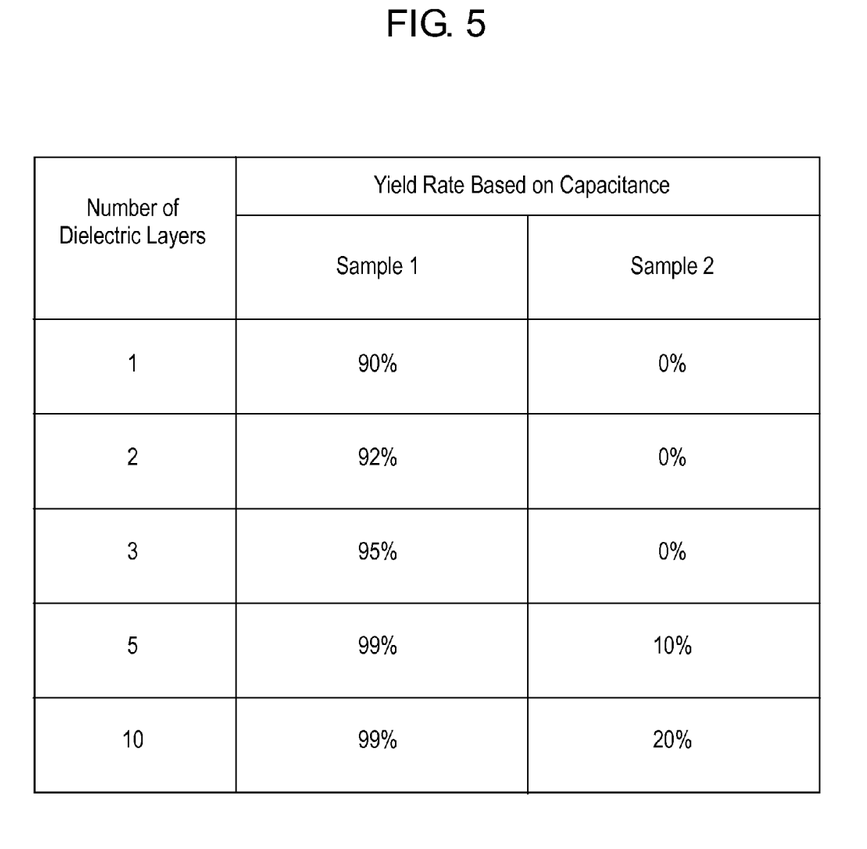
FIG. 5 shows an evaluation result of the capacitor in accordance with Embodiment 1.

FIG. 5 shows evaluation results of capacitor 1 according to Embodiment 1. Sample 1 is capacitor 1 including dielectric layer 4 with various thicknesses according to Embodiment 1. Sample 2 is capacitor 501 of the comparative example shown in FIG. 3 including dielectric layer 4 with various thicknesses. Sample 2 does not have insulating portion 6. A yield rate based on capacitance is confirmed by applying current to Samples 1 and 2. The number of dielectric films 44 (FIGS. 4C and 4D) in dielectric layer 4 ranged from 1 to 10.

As shown in FIG. 5, the yield rate of Sample 1 does not decrease and has high reliability, although Sample 1 including extremely thin dielectric layer 4. In sample 2, the yield rate decreases if the number of dielectric films 44 in dielectric layer 4 decreases and dielectric layer 4 becomes thin. To achieve the same yield rate, dielectric layer 4 of sample 2 requires more laminated dielectric films 44 than that for dielectric layer 4 of Sample 1. Accordingly, capacitor 1 according to Embodiment 1 is highly reliable and has a large capacitance even if the number of laminated dielectric films 44 is small and dielectric layer 4 is thin.

Figure 6A:
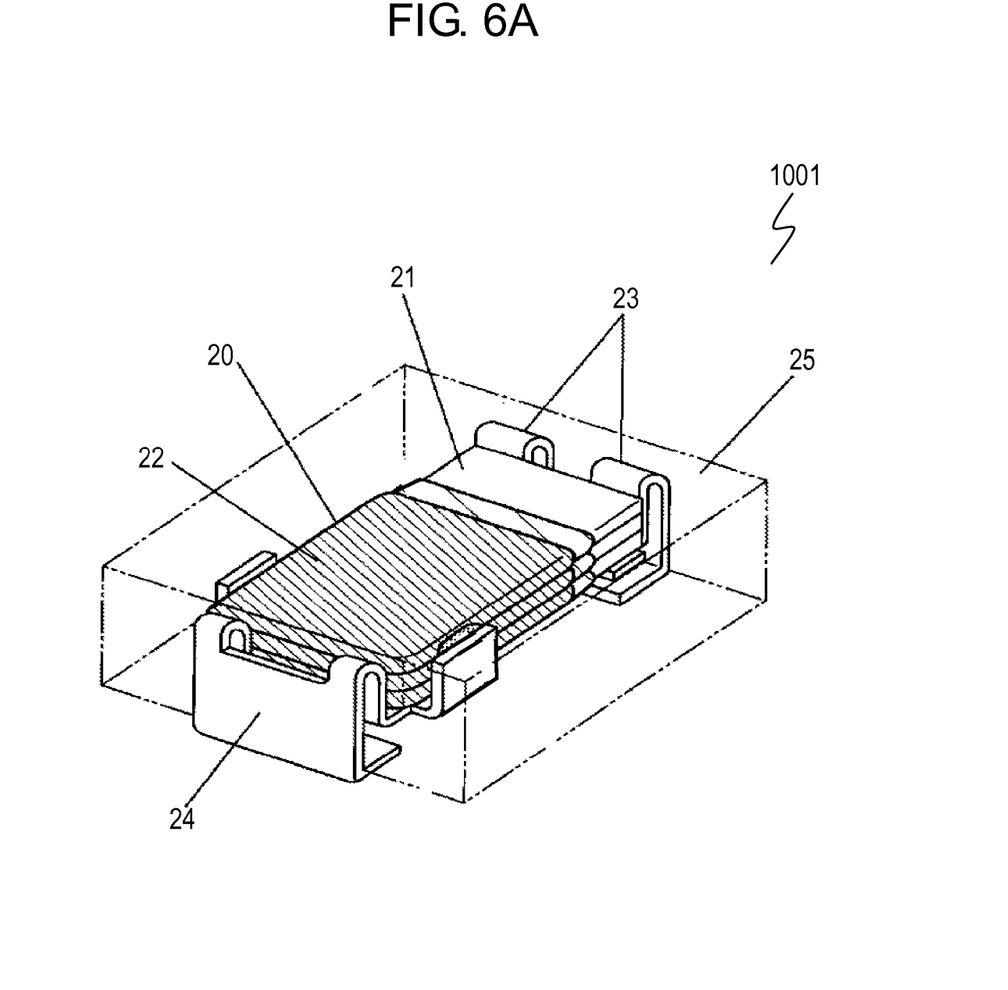
FIG. 6A is a perspective view of the capacitor in accordance with the Embodiment 1.

FIG. 6A is a perspective view of capacitor 1001 according to Embodiment 1. Capacitor 1001 is a solid electrolytic capacitor, and includes multiple laminated capacitor elements 20. Anode foil 21 is configured with a substrate that is electrode 2, and dielectric layer 4 laminated on the substrate. Capacitor element 20 includes anode foil 21, a solid electrolytic layer made of conductive polymer or organic semiconductor formed on dielectric layer 4 of anode foil 21, and a cathode layer made of conductive paste, such as silver paste or carbon paste, formed on the solid electrolytic layer. The solid electrolytic layer and the cathode layer constitute cathode electrode 22. Anode foil 21 of each of multiple laminated capacitor elements 20 is connected to anode terminal 23 (an external terminal). Cathode electrode 22 of each of multiple capacitor elements 20 is connected to cathode terminal 24 (an external terminal). Laminated capacitor elements 20, anode terminal 23, and cathode terminal 24 are covered with package 25 made of insulating resin while a part of anode terminal 23 and a part of cathode terminal 24 are exposed outside.

Figure 6B:
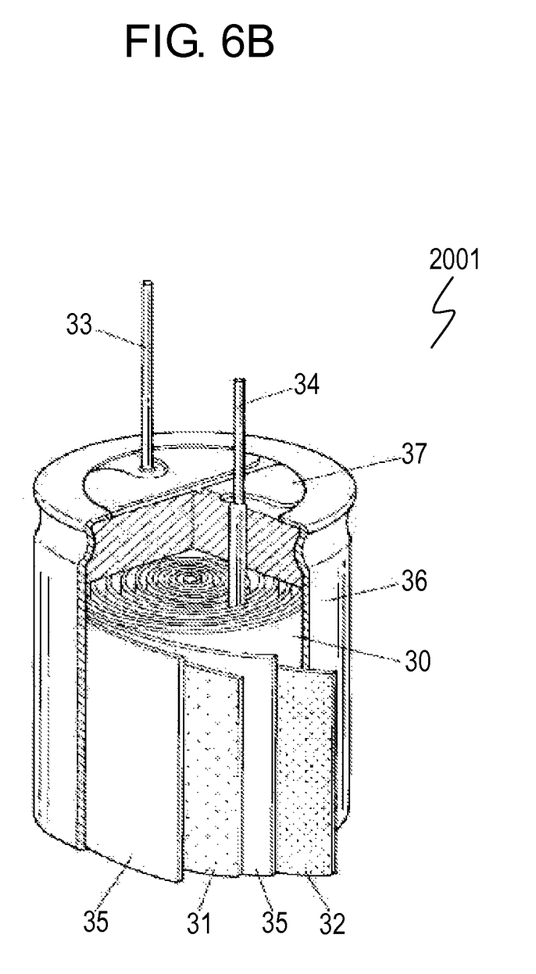
FIG. 6B is a perspective view of another capacitor in accordance with Embodiment 1.

FIG. 6B is a perspective view of another capacitor 2001 according to Embodiment 1. Capacitor 2001 is a roll-type electrolytic capacitor including capacitor element 30. Electrode 2 in which dielectric layers 4 are laminated is used as anode foil 31. Anode foil 31 is connected to anode terminal 33, and cathode foil 32 is connected to cathode terminal 34. Anode foil 31 and cathode foil 32 are laminated via separator 35 and rolled to constitute capacitor element 30. Capacitor element 30 is impregnated with cathode material, such as electrolytic solution, conductive polymer, organic semiconductor, or their composite material, and is accommodated in case 36 having a tubular shape with a bottom. An opening of case 36 is sealed with sealing 37 while a part of anode terminal 33 and a part of cathode terminal 34 are exposed outside. Electrode 2 in which dielectric layers 4 are laminated can also be used as cathode foil 32. Alternatively, electrode 2 may also be used for both anode foil 31 and cathode foil 32.

A capacitor according to Embodiment 1 is not limited to the above configurations. Dielectric layer 4 can be formed on electrode 2 even if electrode 2 is configured with a film substrate and an electrode formed on this substrate. Insulating portion 6 may be formed on electrode 2 after forming the capacitor element.

Figure 7A:
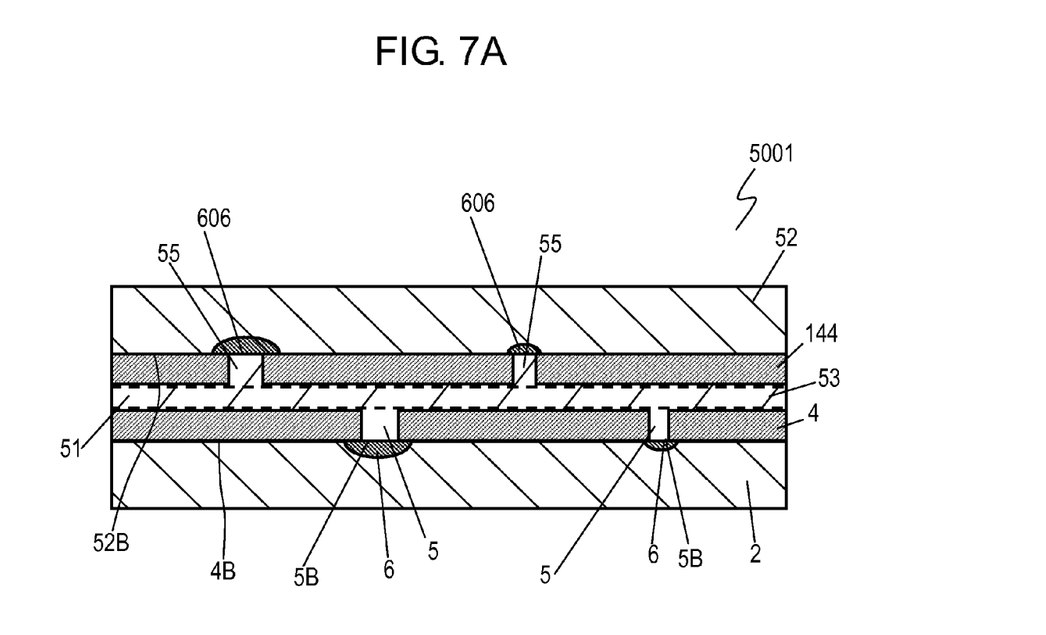
FIG. 7A is a sectional view of still another capacitor in accordance with Embodiment 1.

FIG. 7A is a sectional view of still another capacitor 5001 according to Embodiment 1. In FIG. 7A, components identical to those shown in FIG. 1A are denoted by the same reference numerals. In capacitor 5001, dielectric layer 144 is formed on lower surface 52B of electrode 52 facing electrode 2 via electrolyte 51 and separator 53, in addition to on upper surface 2A of electrode 2. Dielectric layer 144 is formed of plural metal oxide particles 100 (FIG. 2) spread over lower surface 52B of electrode 52, similarly to dielectric layer 4. Aperture 55 having an opening is constituted by space 101 between plural metal oxide particles 100. Aperture 55 faces lower surface 52B of electrode 52, and is formed in dielectric layer 144. Insulating portion 606 is provided on lower surface 52B of electrode 52 so as to cover the opening of aperture 55 similarly to insulating portion 6. Insulating portion 606 has the same effect as insulating portion 6. Insulating portion 606 preferably covers the opening of aperture 55 completely.

Figure 7B:
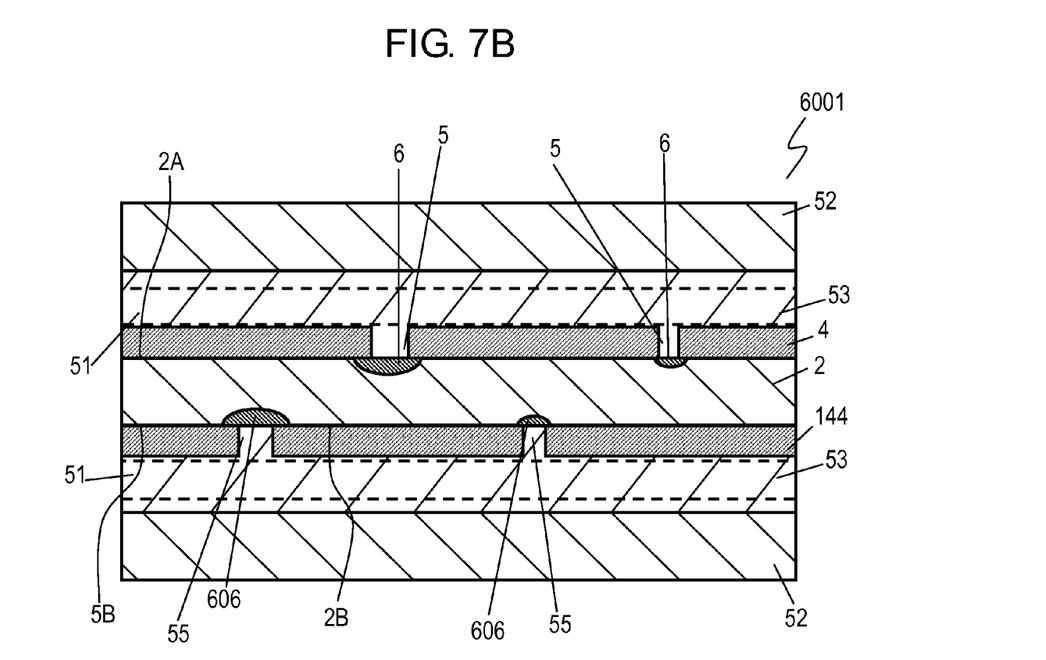
FIG. 7B is a sectional view of a further capacitor in accordance with Embodiment 1.

FIG. 7B is a sectional view of further capacitor 6001 according to Embodiment 1. In FIG. 7B, components identical to those shown in FIG. 1A are denoted by the same reference numerals. In capacitor 6001, dielectric layer 144 is formed on lower surface 2B of electrode 2 in addition to on upper surface 2A of electrode 2. Dielectric layer 144 is configured with plural metal oxide particles 100 (FIG. 2) spread over lower surface 2B of electrode 2, similarly to dielectric layer 4. Aperture 55 having an opening is constituted by space 101 between plural metal oxide particles 100. Aperture 55 faces lower surface 2B of electrode 2, and is formed in dielectric layer 144. Insulating portion 606 covering the opening of aperture 55 is provided on lower surface 2B of electrode 2 by the same method as that of insulating portion 6. Insulating portion 606 has the same effect as insulating portion 6. Insulating portion 606 preferably covers the opening of aperture 55 completely.

Exemplary Embodiment 2

Figure 8:
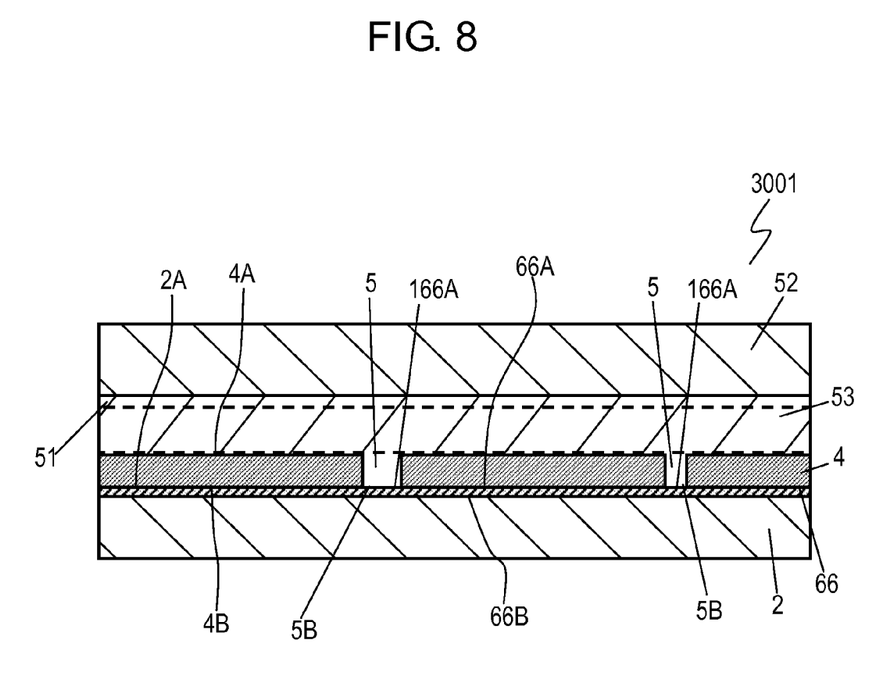
FIG. 8 is a sectional view of a capacitor in accordance with Exemplary Embodiment 2 of the invention

FIG. 8 is a schematic sectional view of capacitor 3001 according to Exemplary Embodiment 2. In FIG. 8, components identical to those of capacitor 1 according to Embodiment 1 shown in FIG. 1 are denoted by the same reference numerals. Capacitor 3001 shown in FIG. 8 further includes insulating film 66 formed on upper surface 2A of electrode 2. Lower surface 66B of insulating film 66 is situated on upper surface 2A of electrode 2. Dielectric layer 4 is formed on upper surface 66A of insulating film 66. Dielectric layer 4 is formed on upper surface 66A of insulating film 66. Dielectric layer 4 is configured with plural metal oxide particles 100 spread over upper surface 66A of insulating film 66. Aperture 5 having an opening is constituted by space 101 between plural metal oxide particles 100. Aperture 5 faces upper surface 66A of insulating film 66, and is formed in dielectric layer 4.

In general, the thickness of an insulating film of a capacitor is determined based on a withstand voltage of the capacitor. The thickness of insulating film 66 of capacitor 3001 according to Embodiment 2 is thinner than the insulating film of a capacitor having the same withstand voltage. In capacitor 3001, the thickness of the insulating film determined based on the withstand voltage is a total of the thicknesses of insulating film 66 and dielectric layer 4.

In capacitor 3001, insulating film 66 is formed entirely on upper surface 2A of electrode 2, and covers opening 5B of aperture 5 in dielectric layer 4, hence reliably preventing the contact of electrode 2 and electrolyte 51 at aperture 5. This reduces a defective rate of capacitor 3001. Insulating film 66 preferably covers opening 5B of aperture 5 completely.

Insulating film 66 includes electrode coating portion 266 disposed between upper surface 2A of electrode 2 and lower surface 4B of dielectric layer 4, and insulating portion 6 that covers opening 5B of aperture 5. This structure can raise a withstand voltage of capacitor 3001. Insulating portion 6 preferably covers opening 5B completely.

Similarly to capacitor 1 according to Embodiment 1, same effect as capacitor 1 according to Embodiment 1 can be achieved by performing an acid treatment, an alkali treatment, or a cathode reduction to upper surface 2A of electrode 2.

Figure 9A:
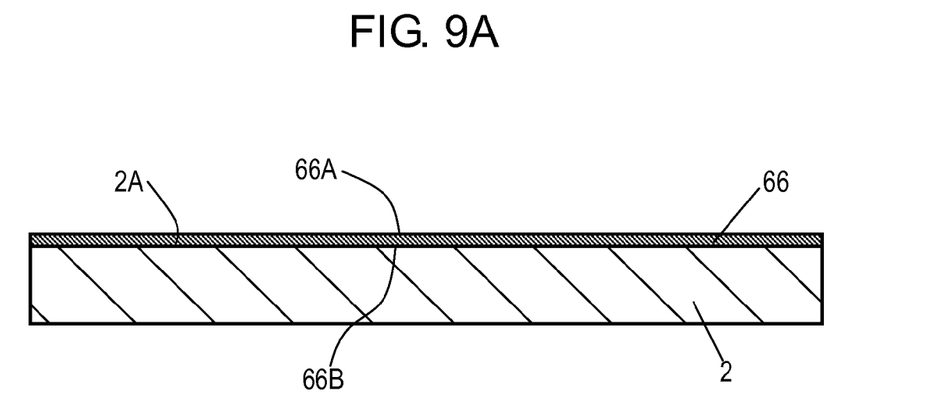
FIG. 9A is a sectional view of the capacitor in accordance with Embodiment 2 for illustrating a process for manufacturing the capacitor.
Figure 9B:
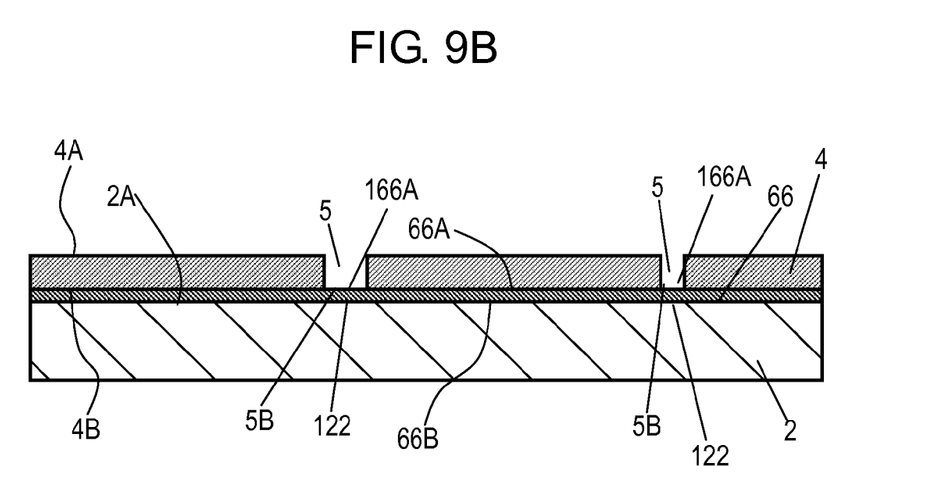
FIG. 9B is a sectional view of the capacitor in accordance with Embodiment 2 for illustrating a process for manufacturing the capacitor.

A method of manufacturing capacitor 3001 will be described below. FIGS. 9A and 9B are sectional views of capacitor 3001 for illustrating the method of manufacturing capacitor 3001.

As shown in FIG. 9A, insulating film 66 is formed by oxidizing upper surface 2A of electrode 2. Electrode 2 is made of a conductive foil, preferably a valve metal foil, such as aluminum or titanium.

Next, as shown in FIG. 9B, dielectric layer 4 is formed on upper surface 66A of insulating film 66. Similarly to Embodiment 1, dielectric layer 4 is made of oxide nanosheets configured with plural metal oxide particles 100 (FIG. 2), and has plural apertures 5 passing from upper surface 4A to lower surface 4B.

Then, as shown in FIG. 8, electrode 52 facing upper surface 4A of dielectric layer 4 is provided, and electrolyte 51 fills between upper surface 4A of dielectric layer 4 and electrode 52. Separator 53 may be disposed between electrodes 2 and 52.

Figure 9C:
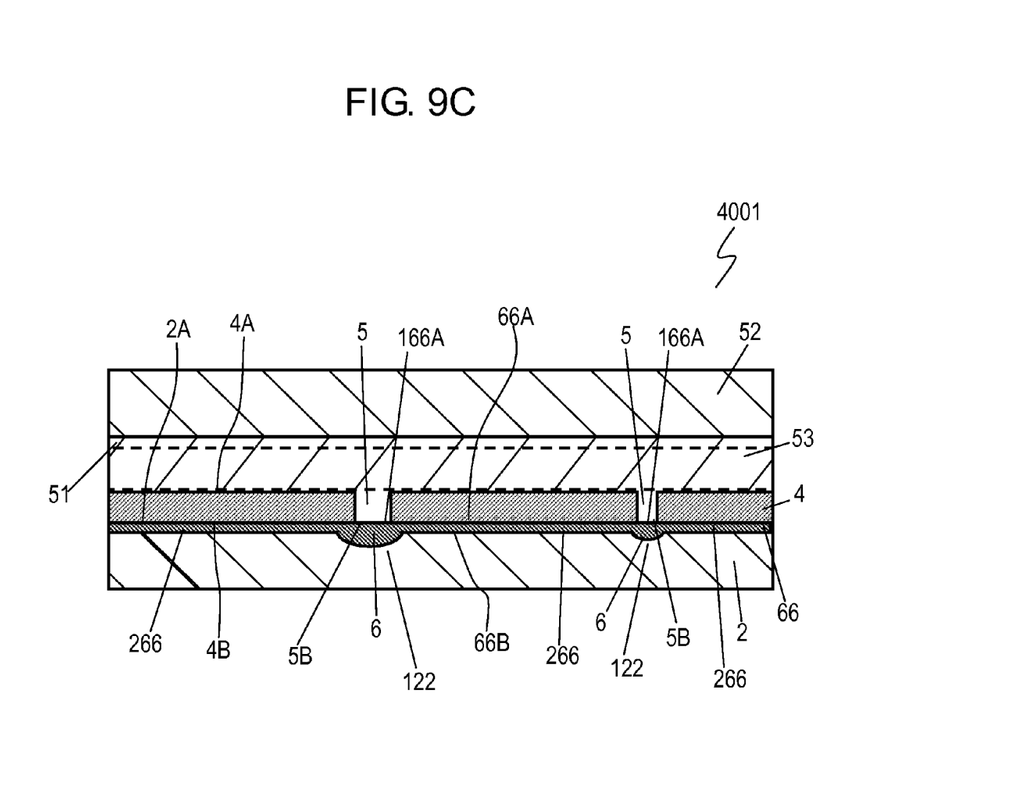
FIG. 9C is a sectional view of another capacitor in accordance with Embodiment 2.

FIG. 9C is a sectional view of another capacitor 4001 according to Embodiment 2. In FIG. 9C, components identical to those of capacitor 3001 shown in FIG. 8 are denoted by the same reference numerals. Insulating film 66 includes electrode coating portion 266 disposed between upper surface 2A of electrode 2 and lower surface 4B of dielectric layer 4, and insulating portion 6 covering opening 5B of aperture 5. Insulating portion 6 is thicker than electrode coating portion 266. This further increases a withstand voltage of capacitor 4001. Insulating portion 6 preferably covers opening 5B completely.

Figure 9D:
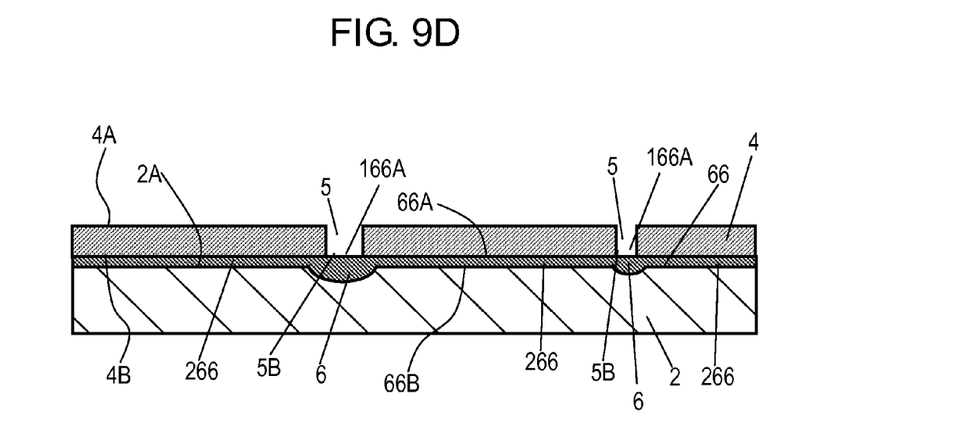
FIG. 9D is a sectional view of the capacitor shown in FIG. 9C for illustrating a process for manufacturing the capacitor.

Next, a method of manufacturing capacitor 4001 will be described below. FIG. 9D is a sectional view of capacitor 4001 for illustrating the method of manufacturing capacitor 4001. In FIG. 9D, components identical to those of capacitor 3001 shown in FIGS. 9A and 9B are denoted by the same reference numerals. As shown in FIG. 9D, non-dielectric-layer portion 166A of insulating film 66 is exposed from aperture 5. Portion 122 of electrode 2 contacts non-dielectric-layer portion 166A. Portion 122 of electrode 2 is oxidized via aperture 5. This forms insulating portion 6 on non-dielectric-layer portion 166A. Insulating portion 6 can be thicker than electrode coating portion 266 between dielectric layer 4 and electrode 2. This increases a withstand voltage of capacitor 3001 Formation of insulating portion due to oxidization of a portion of upper surface 2A of electrode 2 other than portion 122 and its surrounding portion can be prevented by oxidizing portion 122 of electrode 2 via aperture 5.

Then, as shown in FIG. 9C, electrode 52 facing upper surface 4A of dielectric layer 4 is provided, and electrolyte 51 fills between upper surface 4A of dielectric layer 4 and electrode 52. Separator 53 may be disposed between electrodes 2 and 52.

If the withstand voltages of capacitors 3001 and 4001 according to Embodiment 2 is 5V, 2V that is a part of the withstand voltage, for example, can be secured by the thickness of insulating film 66. Remaining of the withstand voltage, which is 3V, can be secured by dielectric layer 4. Accordingly, capacitors 3001 and 4001 secure the thickness of insulating film required for a desired withstand voltage by thicknesses of two layers, i.e., insulating film 66 and dielectric layer 4.

In the case that electrode 2 is made of an aluminum foil, an oxidized aluminum film which is insulating film 66 is formed by oxidizing upper surface 2A of electrode 2. Since the relative dielectric constant of oxidized aluminum is about 8, capacitors 3001 and 4001 with large capacitance can be achieved by making thickness of oxidized nanosheet, such as titanate nanosheet (relative dielectric constant: about 125) and niobate nanosheet (relative dielectric constant: about 300) used as dielectric layer 4, thicker than the thickness of the oxidized aluminum film.

Capacitors 1001 and 2001 can be configured using capacitors 3001 and 4001 in the second exemplary embodiment as capacitor elements 20 and 30 shown in FIGS. 6A and 6B.

According to Embodiments 1 and 2, terms, such as "upper surface" and "lower surface", indicating directions indicate relative directions dependent only on the relative positional relationship of components, such as electrodes 2 and 22 and dielectric layer 4, of capacitor 1, and do not indicate absolute directions, such as a vertical direction.

INDUSTRIAL APPLICABILITY

A capacitor according to the present invention prevents short-circuiting between electrodes, and is thus highly reliable and can reduce a defect rate. Accordingly, the capacitor is effectively applicable to devices that require high reliability such as a range of electronic devices and communications equipment.

REFERENCE MARKS IN THE DRAWINGS

2 Electrode (First Electrode)
4 Dielectric Layer
5 Aperture
6 Insulating Portion
51 Electrolyte
52 Electrode (Second Electrode)
66 Insulating Film

The invention claimed is:
1. An electrolytic capacitor comprising:
a first electrode of the electrolytic capacitor having an upper surface;
a dielectric layer of the electrolytic capacitor having an upper surface and a lower surface which is situated on the upper surface of the first electrode, the dielectric layer including a plurality of metal oxide particles spread over the upper surface of the first electrode, the dielectric layer having an aperture therein, the aperture being constituted by a space provided between the plurality of metal oxide particles; and
an insulating portion of the electrolytic capacitor provided in the first electrode at a portion facing an opening of the aperture of the dielectric layer, the insulating portion covering the opening of the aperture.

2. The electrolytic capacitor according to claim 1, further comprising a second electrode facing the upper surface of the dielectric layer.

3. The electrolytic capacitor according to claim 2, further comprising an electrolyte provided between the upper surface of the dielectric layer and the second electrode such that the electrolyte fills the aperture of the dielectric layer.

4. The electrolytic capacitor according to claim 1, wherein the dielectric layer includes a plurality of dielectric films which are stacked, each of the plurality of dielectric films being made of the plurality of metal oxide particles.

5. The electrolytic capacitor according to claim 1, wherein the aperture of the dielectric layer passes through from the upper surface of the dielectric layer to the lower surface of the dielectric layer.

6. The electrolytic capacitor according to claim 1, wherein a thickness of the dielectric layer is not less than 0.3 nm and not greater than 50 nm.

7. The electrolytic capacitor according to claim 1, wherein a thickness of each of the plurality of metal oxide particles is about a total thickness of several atoms.

8. An electrolytic capacitor according to claim 1, wherein the insulating portion is buried in the upper portion of the first electrode at the portion facing the opening of the aperture of the dielectric layer.

9. The electrolytic capacitor according to claim 1, wherein the insulating portion is formed of an oxide of a metal included in the first electrode.

10. An electrolytic capacitor comprising:
a first electrode of the electrolytic capacitor having an upper surface;
an insulating film of the electrolytic capacitor having an upper surface and a lower surface which is situated on the upper surface of the first electrode;
a dielectric layer of the electrolytic capacitor having an upper surface and a lower surface which is situated on the upper surface of the insulating film, the dielectric layer including a plurality of metal oxide particles spread over the upper surface of the insulating film, the dielectric layer having an aperture having an opening facing the upper surface of the insulating film, the aperture being constituted by a space provided between the plurality of metal oxide particles;
an electrode coating portion provided between the upper surface of the electrode and the lower surface of the dielectric layer;
and an insulating portion covering the opening of the aperture, the insulating portion being thicker than the electrode coating portion.

11. The capacitor according to claim 10, further comprising a second electrode facing the upper surface of the dielectric layer.

12. The capacitor according to claim 11, further comprising an electrolyte provided between the upper surface of the dielectric layer and the second electrode such that the electrolyte fills the aperture of the dielectric layer.

13. The capacitor according to claim 10, wherein the dielectric layer includes a plurality of dielectric films which are stacked, each of the plurality of dielectric films being made of the plurality of metal oxide particles.

14. The capacitor according to claim 10, wherein the aperture of the dielectric layer passes through from the upper surface of the dielectric layer to the lower surface of the dielectric layer.

15. The capacitor according to claim 10, wherein a thickness of the dielectric layer is not less than 0.3 nm and not greater than 50 nm.

16. The capacitor according to claim 10, wherein a thickness of each of the plurality of metal oxide particles is about a total thickness of several atoms.

17. An electrolytic capacitor according to claim 10, wherein the aperture is free of dielectric material.

18. An electrolytic capacitor according to claim 10, wherein the insulating film includes an electrode coating portion provided between the upper surface of the electrode and the lower surface of the dielectric layer, and
an insulating portion covering the opening of the aperture, the insulation portion being thicker directly below the aperture than away from directly below the aperture.

19. A method of manufacturing an electrolytic capacitor, comprising:
forming a dielectric layer on an upper surface of a first electrode;
forming an insulating portion in the first electrode; and
providing a second electrode facing an upper surface of the dielectric layer,
wherein the dielectric layer of the electrolytic capacitor has a lower surface situated on the upper surface of the first electrode,
wherein the dielectric layer of the electrolytic capacitor includes a plurality of metal oxide particles spread over the upper surface of the first electrode,
wherein the dielectric layer of the electrolytic capacitor has an aperture therein having an opening which opens to the lower surface of the dielectric layer, the aperture being constituted by a space provided between the plurality of metal oxide particles, and
wherein the insulating portion covers the opening of the aperture.

20. The method according to claim 19,
wherein the first electrode is made of metal; and
wherein said forming of the insulating portion comprises forming the insulating portion by oxidizing a portion of the upper surface of the first electrode facing the opening of the aperture.

21. The method according to claim 19, wherein a thickness of the dielectric layer is not less than 0.3 nm and not greater than 50 nm.

22. A method of manufacturing an electrolytic capacitor, comprising:
forming an insulating film on an upper surface of a first electrode;
forming a dielectric layer on an upper surface of the insulating film;
forming an insulating portion at the insulating film; and
providing a second electrode facing an upper surface of the dielectric layer,
wherein the dielectric layer of the electrolytic capacitor has a lower surface situated on the upper surface of the insulating film,
wherein the dielectric layer of the electrolytic capacitor includes a plurality of metal oxide particles spread over the upper surface of the insulating film,
wherein the dielectric layer of the electrolytic capacitor has an aperture therein having an opening which opens to the lower surface of the dielectric layer, the aperture being constituted by a space provided between the plurality of metal oxide particles; and
wherein the insulating portion covers the opening of the aperture.

23. The method according to claim 22,
wherein the insulating film includes an electrode coating portion provided between the upper surface of the electrode and the lower surface of the dielectric layer, and wherein the insulating portion is thicker than the electrode coating portion.

24. The method according to claim 23,
wherein the first electrode is made of metal, and
wherein said forming of the insulating portion comprises oxidizing a portion of the electrode contacting a portion of the insulating film contacting the opening of the aperture after said providing the dielectric layer on the upper surface of the insulating film.

25. The method according to claim 22, wherein a thickness of the dielectric layer is not less than 0.3 nm and not greater than 50 nm.

26. A method of manufacturing an electrolytic capacitor according to claim 22, wherein the insulating portion is buried in the upper portion of the first electrode at the portion facing the opening of the aperture of the dielectric layer.

27. A method of manufacturing an electrolytic capacitor according to claim 22, wherein the aperture is free of dielectric material.

28. A method of manufacturing an electrolytic capacitor according to claim 22, wherein the insulating film includes an electrode coating portion provided between the upper surface of the electrode and the lower surface of the dielectric layer, and
an insulating portion covering the opening of the aperture, the insulation portion being thicker directly below the aperture than away from directly below the aperture.

* * * * *